Sept. 19, 1939.  A. E. BAAK  2,173,799
LOAD-COMPENSATED CONTROL SYSTEM
Filed Nov. 23, 1936   2 Sheets-Sheet 2

Inventor
Albert E. Baak
By George H Fisher
Attorney

Patented Sept. 19, 1939

2,173,799

UNITED STATES PATENT OFFICE 2,173,799

LOAD-COMPENSATED CONTROL SYSTEM

Albert E. Baak, Minneapolis, Minn., assignor to Minneapolis-Honeywell Regulator Company, Minneapolis, Minn., a corporation of Delaware Application November 23, 1936, Serial No. 112,334

14 Claims. (Cl. 236—74)

This invention relates to an automatic load compensation or reset mechanism in general, and particularly to that type of mechanism as applied to a follow-up control system.

It is an object of this invention to provide a follow-up control system for controlling the value of a condition along with a novel automatic reset or load compensation mechanism for altering the action of the follow-up means of the follow-up control system whereby the condition to be controlled is maintained at a substantially constant value regardless of changes in load.

Another object of this invention is to provide a novel reset mechanism utilizing a new and novel escapement means. In one embodiment of this invention the escapement means comprises a clock escapement mechanism. In another the escapement means comprises a movable vane, and in another modification the escapement means comprises a time operated brake. The novel construction of these various escapement means also form objects of this invention.

Other objects and advantages will become apparent to those skilled in the art upon reference to the accompanying specification, claims and drawings. For a more thorough understanding of this invention reference is made to the accompanying drawings, in which:

Figure 1:
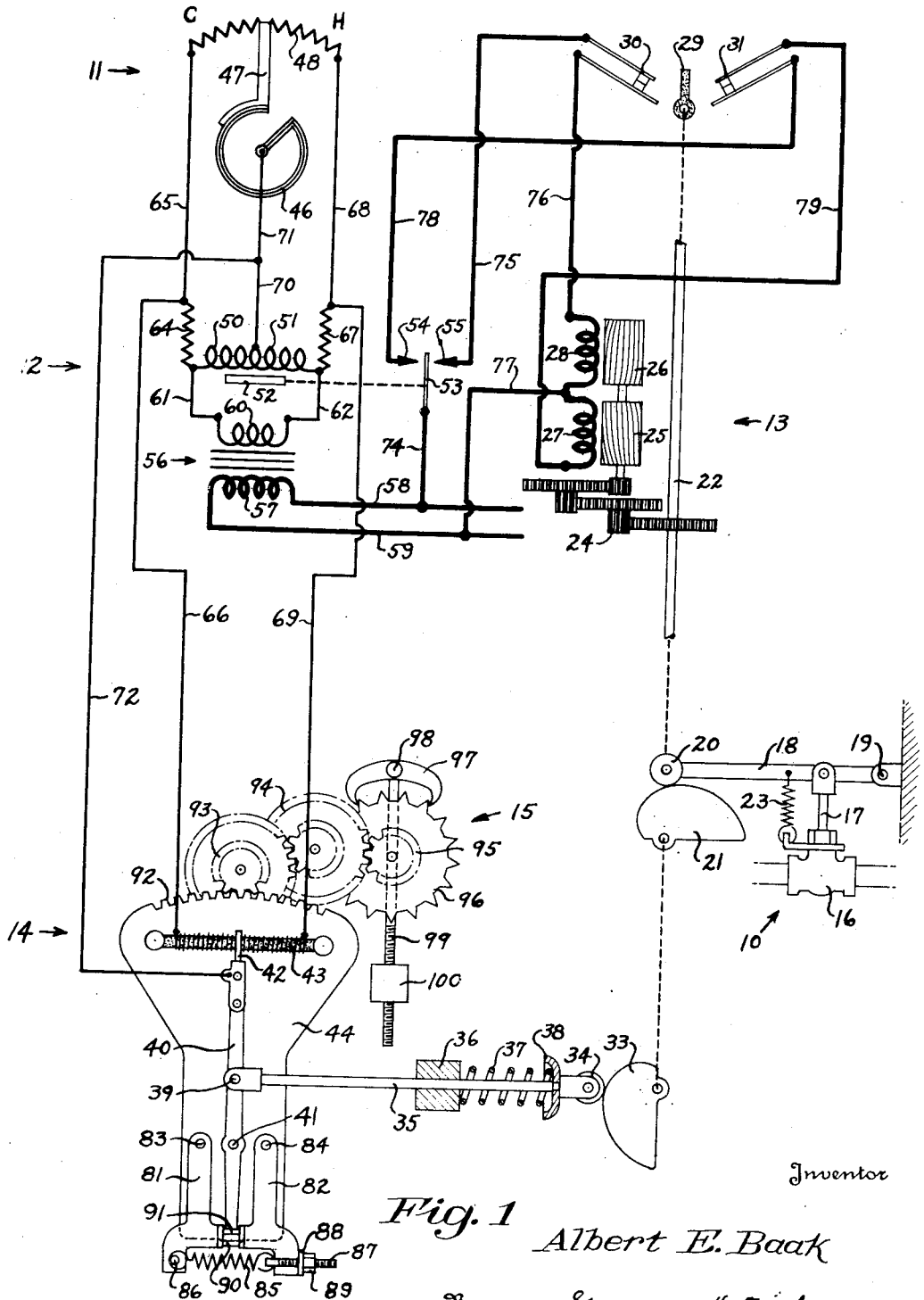
Figure 1 is a diagrammatic view of a follow-up control system along with one form of the automatic reset or load compensation mechanism.

Referring now to Figure 1, a device to be positioned in a plurality of positions for controlling the value of a condition is generally designated at 10. Control means, the state of which is varied in accordance with changes in the value of the condition to be controlled, is generally designated at 11. The control means 11 is adapted to control a relay generally designated at 12 which in turn controls the operation of a motor generally designated at 13. The motor 13 positions the device 10 in a plurality of positions and also operates a follow-up means generally designated at 14. The follow-up means 14 also operates the relay 12 whereby a follow-up control system is provided. A reset or load compensation mechanism is generally designated at 15 for altering the action of the follow-up means 14.

Although the control system of this invention may be utilized for controlling any condition, it is shown for purposes of illustration as controlling a temperature condition and more particularly the temperature of a space (not shown). Therefore, the device 10 which is positioned in a plurality of positions is shown to comprise a valve 16 for controlling the supply of heating fluid to the space. The valve 16 may be operated by a valve stem 17 which is suitably pivoted to a lever 18 which in turn is pivoted upon a stationary pivot 19. The lever 18 carries a cam follower 20 which engages the surface of a cam 21 carried by a shaft 22 of the motor 13. The cam follower 20 is held in engagement with the cam 21 by means of a spring 23. The shaft 22 is rotated through a reduction gear train 24 by motor rotors 25 and 26. The motor rotors 25 and 26 are operated by field windings 27 and 28 respectively. The arrangement is such that when the field winding 28 is energized the cam 21 is rotated in a counter-clockwise direction to move the valve 16 towards an open position and when the field winding 27 is energized the cam 21 is rotated in a clockwise direction to allow the spring 23 to move the valve 17 towards a closed position. The shaft 22 also operates an abutment member 29 preferably made of insulating material for opening limit switches 30 and 31 when the valve 16 is moved to either an extreme open position or an extreme closed position.

The shaft 22 also operates a cam 33 which is engaged by a cam follower 34. The cam follower 34 is carried by a stem 35 which is suitably guided in a guide 36. A spring 37 interposed between the guide 36 and a spring retainer cup 38 holds the cam follower 34 in engagement with the cam 33. The rod 35 is pivoted at 39 to a lever 40 which in turn is pivoted upon a stationary pivot 41. The lever 40 carries a slider 42 which is adapted to slide across a potentiometer resistance element 43. The slider 42 and the resistance element 43 form a balancing potentiometer the operation of which will be pointed out more fully hereafter. The balancing potentiometer resistance element 43 is carried by a plate 44 which is also pivoted on the stationary pivot 41. When the valve 16 is moved towards an open position the cam 33 is rotated in a counter-clockwise direction to allow the spring 37 to move the slider 42 to the right with respect to the balancing potentiometer resistance element 43, and conversely, when the valve 16 is moved towards a closed position the cam 33 is rotated in a clockwise direction to move the slider 42 to the left with respect to the balancing potentiometer resistance element 43.

The control means generally designated at 11 is shown to be a thermostatic control means comprising a thermostatic element 46 responsive to variations in the space temperature. The thermostatic element 46 operates a slider 47 with respect to a control potentiometer resistance element 48. Upon an increase in space temperature the slider 47 is moved to the right in the direction indicated by the character H and upon a decrease in space temperature the slider 47 is moved to the left in the direction indicated by the character C. When the space temperature is at the desired normal value the slider 47 is maintained in the mid position with respect to the control potentiometer resistance element 48 as shown in the drawings, and this represents the normal state of the control means.

The relay generally designated at 12 may comprise relay coils 50 and 51 for operating an armature 52. The armature 52 is suitably connected to a switch arm 53 which is adapted to engage spaced contacts 54 and 55. When the relay coil 50 is energized more than the relay coil 51 the switch arm 53 is moved into engagement with the contact 54 and when the relay coil 51 is energized more than the relay coil 50 the switch arm 53 is moved into engagement with the contact 55. When the relay coils 50 and 51 are equally energized the switch arm 53 is maintained spaced midway between the contacts 54 and 55 as shown in Figure 1. Power is supplied to the relay 12 by means of a step-down transformer generally designated at 56 having a primary 57 connected across line wires 58 and 59 and a secondary 60. One end of the secondary 60 is connected by a wire 61 to the left end of the relay coil 50 and the other end of the secondary 60 is connected by a wire 62 to the right-hand end of the relay coil 51. The adjacent ends of the relay coils 50 and 51 are connected together. By reason of these wiring connections the relay coils 50 and 51 are connected in series and across the secondary 60.

The left end of the relay coil 50 is connected by a protective resistance 64 and wires 65 and 66 to the left ends of the control potentiometer resistance element 48 and the balancing potentiometer resistance element 43. In a like manner the right end of the relay coil 51 is connected by a protective resistance 67 and wires 68 and 69 to the right ends of the control potentiometer resistance element 48 and the balancing potentiometer resistance element 43. The junction of the relay coils 50 and 51 is connected by wires 70, 71 and 72 to the slider 47 of the control potentiometer and the slider 42 of the balancing potentiometer. From these wiring connections it is seen that the control potentiometer and the balancing potentiometer are connected in parallel with the series connected relay coils 50 and 51 and across the secondary 60 of the step-down transformer 56.

Assume now that the plate 44 which carries the balancing potentiometer resistance element 43 remains stationary, that the space temperature is at the desired normal value, and that the valve 16 is in a mid position for supplying just the correct amount of heat to the space to make up for the heating load. Under these conditions the parts will assume the position shown in Figure 1. Upon a decrease in space temperature the slider 47 is moved to the left in the direction indicated by the character C and by reason of the above referred to parallel relationship the relay coil 50 is partially short-circuited to decrease the energizations thereof and to increase the energization of the relay coil 51. As a result of these unequal energizations of the relay coils 50 and 51 the switch arm 53 is moved into engagement with the contact 55 to complete a circuit from the line wire 58 through wire 74, switch arm 53, contact 55, wire 75, limit switch 30, wire 76, field winding 28 and wire 77 back to the other line wire 59. Completion of this circuit energizes the field winding 28 to move the valve 16 towards an open position to increase the supply of heat to the space. Operation of the motor 13 to move the valve 16 towards an open position also causes right-hand movement of the slider 42 with respect to the balancing potentiometer resistance element 43. This right-hand movement of the slider 42 partially short-circuits the relay coil 51 to decrease the energization thereof and to increase the energization of the relay coil 50, and when the slider 42 has moved sufficiently far to the right to rebalance the energizations of the relay coils 50 and 51 the switch arm 53 is moved out of engagement with the contact 55 to stop further opening movement of the valve 16. In this manner the valve 16 is modulated toward an open position in accordance with the amount of decrease in space temperature.

Upon an increase in space temperature the slider 47 is moved to the right in the direction indicated by the character H and this causes partial short-circuiting of the relay coil 51 to decrease the energization thereof and increase the energization of the relay coil 50. The switch arm 53 is thereupon moved into engagement with the contact 54 to complete a circuit from the line wire 58 through wire 74, switch arm 53, contact 54, wire 78, limit switch 31, wire 79, field winding 27 and wire 77 back to the other line wire 59. Completion of this circuit energizes the field winding 27 to move the valve 16 towards a closed position. Operation of the motor 13 to move the valve 16 towards the closed position causes left-hand movement of the slider 42 of the balancing potentiometer. This left-hand movement of the slider 42 partially short-circuits the relay coil 50 to decrease the energization and increase the energization of the relay coil 51. When the slider 42 has moved sufficiently far to the left to rebalance the energizations of the relay coils 50 and 51, the switch arm 53 is moved out of engagement with the contact 54 to prevent further closing movement of the valve 16. In this manner the valve 16 is modulated towards a closed position in accordance with an increase in space temperature.

By reason of the above construction and mode of operation a true follow-up system is provided. It is found that "hunting" is liable to occur if the control range of the control means 11 is made sufficiently narrow to give extremely accurate temperature control. In order to obviate "hunting" the control range must be widened but when the control range is so widened a "droop" in the control system becomes apparent, that is, the temperature maintained in the space is lower when the heating load is relatively great than when the heating load is relatively light. In order to eliminate "hunting" and to also eliminate this "drooping" characteristic of the follow-up control system the automatic reset mechanism generally designated at 15 is provided.

Opposed levers 81 and 82 are secured by pivots 83 and 84 to the plate 44. A spring 85 is carried by a pin 86 on the lever 81 and by a screw 87 carried by the lever 82. The screw 87 is adjusted longitudinally by a nut 89 which abuts an upturned lug 88 on the lever 82. The spring 85 being placed under tension holds the levers 81 and 82 into engagement with an upturned lug 90 carried by the lower extremity of the plate 44. The amount of tension placed in the spring 85 may be adjusted by suitably rotating the nut 89. The lever 40 carries an upturned lug 91 to be engaged by the levers 81 and 82 and therefore the lever 40 is biased to a given position with respect to the plate 44 by means of the spring 85.

The plate 44 carries at its upper extremity a plurality of teeth 92 which are engaged by a gear 93. The gear 93 is connected through a suitable gear train 94 to a gear 95. The gear 95 in Figure 1 is adapted to operate an escapement wheel 96. Whenever the plate 44 is moved the escapement wheel 96 is rotated. The rate of rotation of the escapement wheel 96 is controlled by a pallet lever 97 pivoted at 98 in a well known manner. The pallet lever 97 is provided with a pendulum 99 upon which is mounted a weight 100 and by suitably raising or lowering the weight 100 the rate at which the pallet lever 97 allows rotation of the escapement wheel 96 may be adjusted.

With the parts in the position shown in Figure 1, assume that the load on the heating system increases. This increase causes left-hand movement of the slider 47 to partially short-circuit the relay coil 50 to decrease the energization thereof and increase the energization of the relay coil 51, whereupon the valve 16 is moved towards the open position and the slider 42 of the balancing potentiometer is moved towards the right. Movement of the slider 42 towards the right rebalances the relay 12 in the manner pointed out above and the lug 91 also moves the lever 81 out of engagement with the upturned lug 90 carried by the plate 44 which increases the tension in the spring 85. The tension in the spring 85 is transmitted through the lever 82 and the lug 90 to the plate 44 to rotate the plate 44 in a clockwise direction. Rotation of the plate 44 in a clockwise direction operates the escapement wheel 96 through the gear train 94 but since rotation of the escapement wheel 96 is retarded by the pallet lever 97 the plate 44 is not immediately rotated in the clockwise direction but the rotation thereof is retarded. As the escapement mechanism operates, the plate 44 rotates in a clockwise direction to move the balancing potentiometer resistance element 43 towards the right with respect to the slider 42. This right-hand movement of the resistance element 43 causes partial short-circuiting of the relay coil 50 to decrease the energization thereof and increase the energization of the relay coil 51 whereupon the valve 16 is moved further towards an open position to increase the supply of heat to the space to make up for the increased heating load. Movement of the valve 16 further towards an open position in this manner increases the tension in the spring 85 and causes further operation of the escapement mechanism and in this manner the valve 16 will be continued in its movement towards the open position as long as the space temperature is less than the desired normal value. When the space temperature returns to the desired normal value the relay 12 becomes balanced and the valve 16 is maintained in its newly adjusted position with respect to the value of the space temperature. This newly adjusted position is in accordance with the increase in heating load.

Upon a decrease in heating load the space temperature increases and the slider 47 of the control potentiometer moves to the right in the direction indicated by the character H and as a result of this movement the valve 16 is moved towards a closed position. As the valve 16 is moved towards a closed position the slider 42 of the balancing potentiometer is moved towards the left to rebalance the relay 12, and therefore the valve 16 is modulated towards a closed position in proportion to the amount of increase in space temperature. Movement of the slider 42 to the left swings the lever 82 outwardly to increase the tension in the spring 85. The tension in the spring 85 is transmitted through the lever 81 and the upturned lug 90 to the plate 44 to rotate the plate 44 in a counter-clockwise direction and to move the resistance element 43 to the left with respect to the slider 42. Movement of the resistance element 43 towards the left decreases the energization of the relay coil 51 and increases the energization of the relay coil 50 whereupon the valve 16 is moved further towards a closed position and the valve 16 will be continued in its closing movement until such time as the space temperature is restored to the desired normal value. Therefore the valve 16 is positioned towards a closed position in accordance with the decrease in the heating load.

By reason of the above construction the valve 16 is positioned in accordance with variations in space temperature and is additionally positioned in accordance with changes in the heating load, whereby the space temperature is maintained at the desired normal value regardless of changes in the heating load. The rate at which the valve 16 is moved further in either direction in accordance with changes in the load is controlled by the reset mechanism comprising the clock escapement mechanism. By suitably adjusting the weight 100 on the pendulum 99 the rate of reset of the valve 16 may be adjusted. At this point it is noted that the further the space temperature deviates from the desired normal value the further the motor 13 is operated and the more tension is placed in the spring 85. The clock escapement mechanism will be operated more rapidly when the tension in the spring 85 is great than it will when the tension is small. Therefore, the rate of reset varies in accordance with the amount of deviation in space temperature. If the parts of the control system of Figure 1 are properly adjusted "hunting" and the "drooping" characteristic of the control system is entirely eliminated and the space temperature is maintained at the desired normal value regardless of changes in load on the system.

Figure 2:
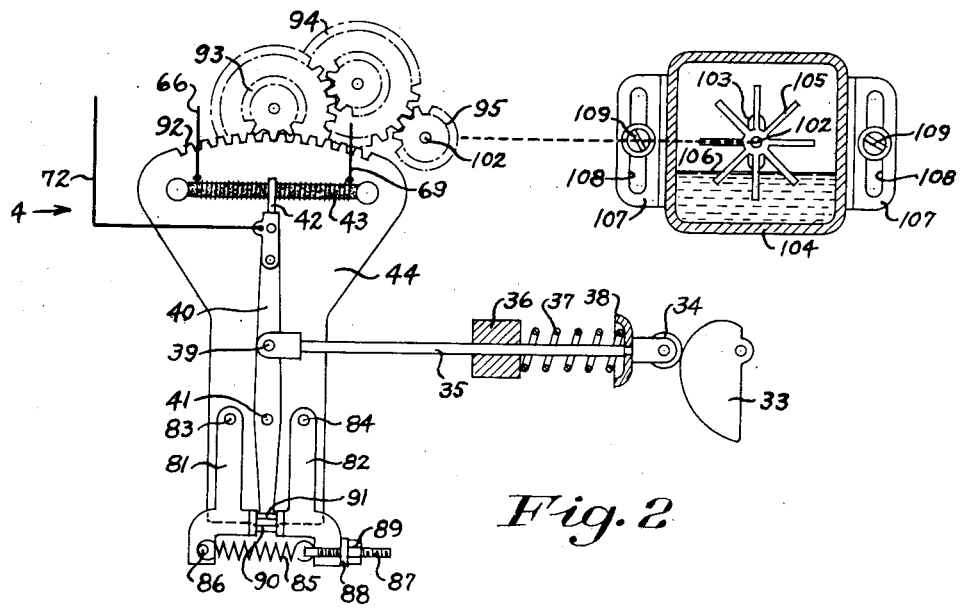
Figure 2 is a partial view similar to Figure 1 but showing a modified form of the automatic reset or load compensation mechanism.

In Figure 2 there is illustrated the follow-up mechanism 14 and the spring means 85 for biasing the resistance element 43 to a given position with respect to the slider 42 of the follow-up mechanism. This is carried out in exactly the same way as in Figure 1 and therefore like reference characters have been used throughout. However, in Figure 2 a different type of escapement mechanism is utilized, this type being a movable vane arrangement. The gear 95 which is rotated through the gear train 94 is mounted on a shaft 102. The shaft 102 extends through a vertical slot 103 in a casing 104. A vane in the form of a paddle wheel 105 is mounted on the shaft 102 and the paddle wheel is adapted to pass through a liquid contained in the container 104. Preferably the liquid is maintained at a level designated 106. The liquid in the container 104 retards the rotation of the paddle wheel 105 and therefore retards the biasing action of the spring 85. The container 104 carries lugs 107 which are provided with slots 108. Screws 109 extending through the slots 108 form an adjustable mounting for the container 104. By loosening the screws 109 and lowering the container 104 the retarding effect of the liquid on the paddle wheel is decreased and by raising the container 104 the retarding effect of the liquid on the paddle wheel 105 is increased. In this manner the rate at which the spring 85 moves the resistance element 43 with respect to the slider 42 of the balancing potentiometer may be adjusted. The mechanism illustrated in Figure 2 operates in exactly the same manner as that illustrated in Figure 1 and is included to show a different form of escapement mechanism for performing the same results as are obtained by the clock escapement mechanism of Figure 1. A further description, therefore, of Figure 2 is considered unnecessary.

Figure 3:
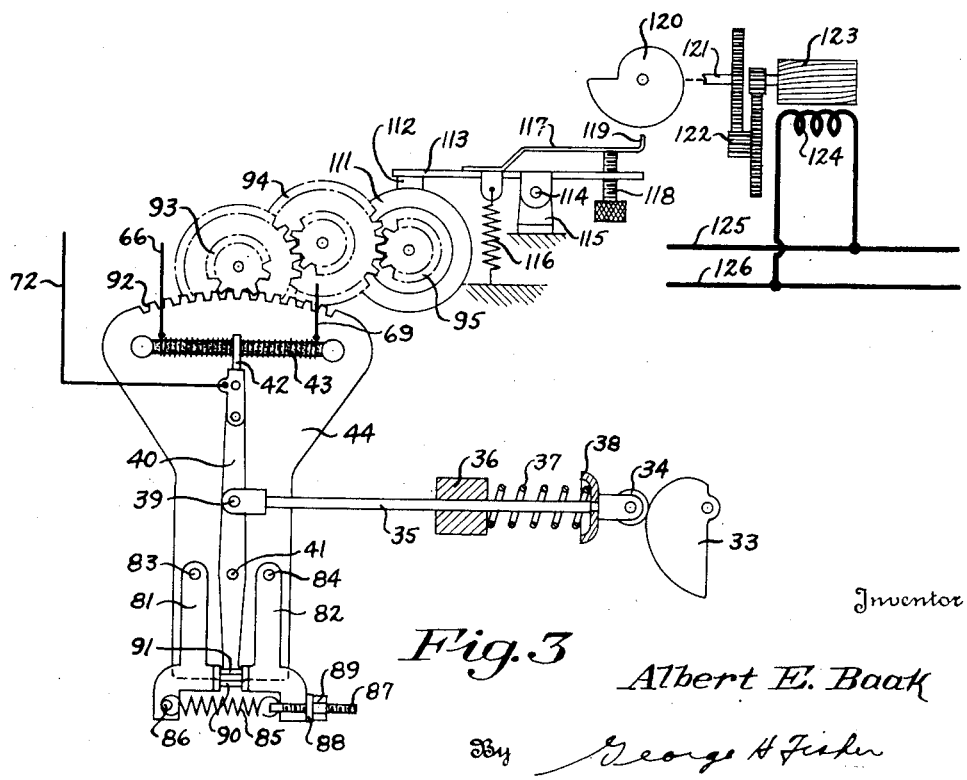
Figure 3 illustrates still another form which the automatic reset mechanism of this invention may follow.

Figure 3 discloses an escapement mechanism which may be substituted for that of Figures 1 and 2. The corresponding parts of Figures 1 and 3 have been identified by the same reference characters in order to facilitate the understanding of this form of the invention. In Figure 3, however, the gear 95 which is operated through the reduction gear train 94 operates a fly-wheel 111. The fly-wheel 111 is adapted to be engaged by a brake shoe 112 carried by a lever 113. The lever 113 is pivoted at 114 to a stationary bracket 115 and the brake shoe 112 is normally held in engagement with the fly-wheel 111 by a spring 116. The lever 113 carries a spring arm 117 which engages an adjusting screw 118. The end of the spring arm 117 has an upturned portion 119 adapted to be engaged by a cam 120. The cam 120 is carried by a shaft 121 which is operated through a reduction gear train 122 by a motor rotor 123. The rotor 123 is continuously operated by a field winding 124 which is connected across line wires 125 and 126. In this manner the cam 120 is continuously operated. When the brake shoe 112 engages the fly-wheel 111 rotation of the plate 44 by the spring 85 is prevented but when the brake shoe 112 is moved out of engagement with the fly-wheel 111 the spring 85 may move the plate 44. Therefore, when the cam 120 engages the upturned portion 119 the brake is released and the spring 85 causes rotation of the plate 44. The fly-wheel 111 is of considerable mass so that the biasing action of the spring 85 will be somewhat retarded when the brake is released. By reason of this construction the brake 112 is intermittently released and the resistance element 43 is centered with respect to the slider 42. In order to adjust the rate of reset provision is made for varying the length of time which the brake shoe 112 is released. This adjustment is provided by the adjusting screw 118. As the screw 118 moves the upturned portion upwardly the length of time which the brake shoe 112 is released is increased and therefore the rate of reset is increased. As the upturned portion 119 is lowered the length of time that the brake shoe 112 is released is decreased and therefore the rate of reset is decreased. By reason of this control system illustrated in Figure 3, substantially the same results are accomplished as that illustrated in Figure 1.

From the above it is seen that I have provided a control system with a novel reset mechanism acting in conjunction with a follow-up means whereby a condition to be controlled is maintained at a substantially constant value regardless of variations in load. Provision is also made for adjusting the rate of reset.

Although for purposes of illustration I have shown several forms of this invention, other forms thereof may become obvious to those skilled in the art upon reviewing this specification, and therefore, this invention is to be limited only by the scope of the appended claims and prior art.

I claim as my invention:

1. In combination, a device to be positioned in a plurality of positions for controlling the value of a condition, control means the state of which is varied in accordance with changes in the value of the condition and having a normal state corresponding to a desired normal value of the condition to be controlled, means including follow-up means operated by said device, controlled by said control means for positioning said device in accordance with changes in the value of the condition, said follow-up means including a member and an element movable with respect to each other, means operated by said device for moving said element with respect to said member, means for biasing said member to a given position with respect to said element additionally to position the device with respect to the state of the control means, means including a gear train operatively connected with said member for retarding the biasing action of said biasing means, and means for controlling the operation of the gear train.

2. In combination, a device to be positioned in a plurality of positions for controlling the value of a condition, control means the state of which is varied in accordance with changes in the value of the condition and having a normal state corresponding to a desired normal value of the condition to be controlled, means, including follow-up means operated by said device, controlled by said control means for positioning said device in accordance with changes in the value of the condition, said follow-up means including an element and a member pivoted on a common axis, means operated by the device for moving the element with respect to the member, resilient means carried by the member and cooperating with the element for biasing the member to a given position with respect to the element additionally to position the device with respect to the state of the control means, and means for retarding the biasing action of the resilient means.

3. In combination, a device to be positioned in a plurality of positions for controlling the value of a condition, control means the state of which is varied in accordance with changes in the value of the condition and having a normal state corresponding to a desired normal value of the condition to be controlled, means, including follow-up means operated by said device, controlled by said control means for positioning said device in accordance with changes in the value of the condition, and a clock escapement mechanism associated with said follow-up means for altering the action thereof to position said device differently with respect to the value of the condition being controlled.

4. In combination, a device to be positioned in a plurality of positions for controlling the value of a condition, control means the state of which is varied in accordance with changes in the value of the condition and having a normal state corresponding to a desired normal value of the condition to be controlled, means, including follow-up means operated by said device, controlled by said control means for positioning said device in accordance with changes in the value of the condition, a receptacle containing a fluid, and a paddle wheel operating in the fluid and operative upon the follow-up means for altering the action thereof to position said device differently with respect to the value of the condition being controlled.

5. In combination, a device to be positioned in a plurality of positions for controlling the value of a condition, control means the state of which is varied in accordance with changes in the value of the condition and having a normal state corresponding to a desired normal value of the condition to be controlled, means, including follow-up means operated by said device, controlled by said control means for positioning said device in accordance with changes in the value of the condition, and a time operated brake mechanism associated with said follow-up means for altering the action thereof to position said device differently with respect to the value of the condition being controlled.

6. In combination, a device to be positioned in a plurality of positions for controlling the value of a condition, control means the state of which is varied in accordance wtih changes in the value of the condition and having a normal state corresponding to a desired normal value of the condition to be controlled, means, including follow-up means operated by said device, controlled by said control means for positioning said device in accordance with changes in the value of the condition, said follow-up means including a member and an element movable with respect to each other, means operated by said device for moving said element with respect to said member, means for biasing said member to a given position with respect to said element additionally to position the device with respect to the state of the control means, and a clock escapement mechanism operatively connected to said member for retarding the biasing action of the biasing means.

7. In combination, a device to be positioned in a plurality of positions for controlling the value of a condition, control means the state of which is varied in accordance with changes in the value of the condition and having a normal state corresponding to a desired normal value of the condition to be controlled, means, including follow-up means operated by said device, controlled by said control means for positioning said device in accordance with changes in the value of the condition, said follow-up means including a member and an element movable with respect to each other, means operated by said device for moving said element with respect to said member, means for biasing said member to a given position with respect to said element additionally to position the device with respect to the state of the control means, and a rotatable vane mechanism operatively connected to said member for retarding the biasing action of the biasing means.

8. In combination, a device to be positioned in a plurality of positions for controlling the value of a condition, control means the state of which is varied in accordance with changes in the value of the condition and having a normal state corresponding to a desired normal value of the condition to be controlled, means, including follow-up means operated by said device, controlled by said control means for positioning said device in accordance with changes in the value of the condition, said follow-up means including a member and an element movable with respect to each other, means operated by said device for moving said element with respect to said member, means for biasing said member to a given position with respect to said element additionally to position the device with respect to the state of the control means, and a time operated brake mechanism operatively connected to said member for retarding the biasing action of the biasing means.

9. In combination, a device to be positioned in a plurality of positions for controlling the value of a condition, control means the state of which is varied in accordance with changes in the value of the condition and having a normal state corresponding to a desired normal value of the condition to be controlled, means, including follow-up means operated by said device, controlled by said control means for positioning said device in accordance with changes in the value of the condition, said follow-up means including a member and an element movable with respect to each other, means operated by said device for moving said element with respect to said member, means for biasing said member to a given position with respect to said element additionally to position the device with respect to the state of the control means, means including a gear train operatively connected with said member for retarding the biasing action of said biasing means, means for controlling the operation of the gear train, and means for adjusting the controlling action of said last mentioned means.

10. In combination, a device to be positioned in a plurality of positions for controlling the value of a condition, control impedance means adjusted in accordance with changes in the value of the condition to be controlled and having a normal adjustment corresponding to a desired normal value of the condition, balancing impedance means adjusted by said device, means controlled by said control impedance means and said balancing impedance means for positioning said device in accordance with changes in the value of the condition to be controlled, said balancing impedance means including an element and a member movable with respect to each other for performing a control function, means operated by the device for moving the element with respect to the member, means for biasing the member to a given position with respect to the element additionally to position the device with respect to the adjustment of the control impedance means, means including a gear train operatively connected with said member for retarding the biasing action of the biasing means, and means for controlling the operation of the gear train.

11. A reset mechanism for device which controls the value of a condition comprising in combination, a member, an element movable with respect to the member for performing a controlling function, means for moving the element with respect to the member, resilient means for biasing the member to a given position with respect to the element, and a clock escapement mechanism operatively connected to said member for retarding the biasing action of the resilient means.

12. A reset mechanism for device which controls the value of a condition comprising in combination, a member, an element movable with respect to the member for performing a controlling function, means for moving the element with respect to the member, resilient means for biasing the member to a given position with respect to the element, and a rotatable vane mechanism operatively connected to said member for retarding the biasing action of the resilient means.

13. A reset mechanism for device which controls the value of a condition comprising in combination, a member, an element movable with respect to the member for performing a controlling function, means for moving the element with respect to the member, resilient means for biasing the member to a given position with respect to the element, and a time operated brake mechanism operatively connected to said member for retarding the biasing action of the resilient means.

14. A reset mechanism for device which controls the value of a condition comprising in combination, a member, an element movable with respect to the member for performing a controlling function, means for moving the element with respect to the member, resilient means for biasing the member to a given position with respect to the element, a brake for overcoming the biasing action of the resilient means, and time operated means for intermittently releasing the brake whereby the biasing action of the resilient means is retarded.

ALBERT E. BAAK.